United States Patent [19]

Alphen

[11] 4,223,375
[45] Sep. 16, 1980

[54] HEADLIGHT SYSTEMS FOR MOTOR CYCLES

[76] Inventor: Jacques M. Alphen, 67, Allee Jules Verne, 78 La Celle Saint-Cloud, France

[21] Appl. No.: 944,110

[22] Filed: Sep. 20, 1978

[30] Foreign Application Priority Data

Sep. 23, 1977 [FR] France .................................. 77 28724

[51] Int. Cl.$^2$ .......................... F21V 33/00; B62J 5/02; F21V 21/26
[52] U.S. Cl. ..................................... 362/72; 362/61; 362/269; 362/276; 364/434
[58] Field of Search ..................... 362/66, 71, 72, 276, 362/269, 271, 275; 244/3.1, 3.2, 79; 364/424, 426, 434, 453

[56] References Cited

U.S. PATENT DOCUMENTS

| | | | |
|---|---|---|---|
| 3,984,072 | 10/1976 | Prajenau | 364/434 |
| 4,075,469 | 2/1978 | Alphen | 362/72 |
| 4,080,655 | 3/1978 | Bürger | 364/434 |

Primary Examiner—Donald P. Walsh
Attorney, Agent, or Firm—Cullen, Sloman, Cantor, Grauer, Scott & Rutherford

[57] ABSTRACT

A system for adjusting the headlamp of a motor cycle as the motor cycle adopts an inclined position when traversing a curve, in such a way that the effect of the motor cycle inclination on the headlamp beam attitude is substantially compensated. The magnitude of the inclination of the motor cycle is detected by an acceleration transducer comprising a mass movable under the control of a spring, in a direction which is generally vertical while the motor cycle is upright. The direction of the inclination of the motorcycle is detected by a gyroscope system; more specifically, a rate gyroscope is used, which provides a signal only when the inclination of the motor cycle is actually changing. A logic circuit is provided to maintain an indication of whether the motor cycle is leaning to the left or the right when the inclination of the motor cycle has ceased to change.

5 Claims, 1 Drawing Figure

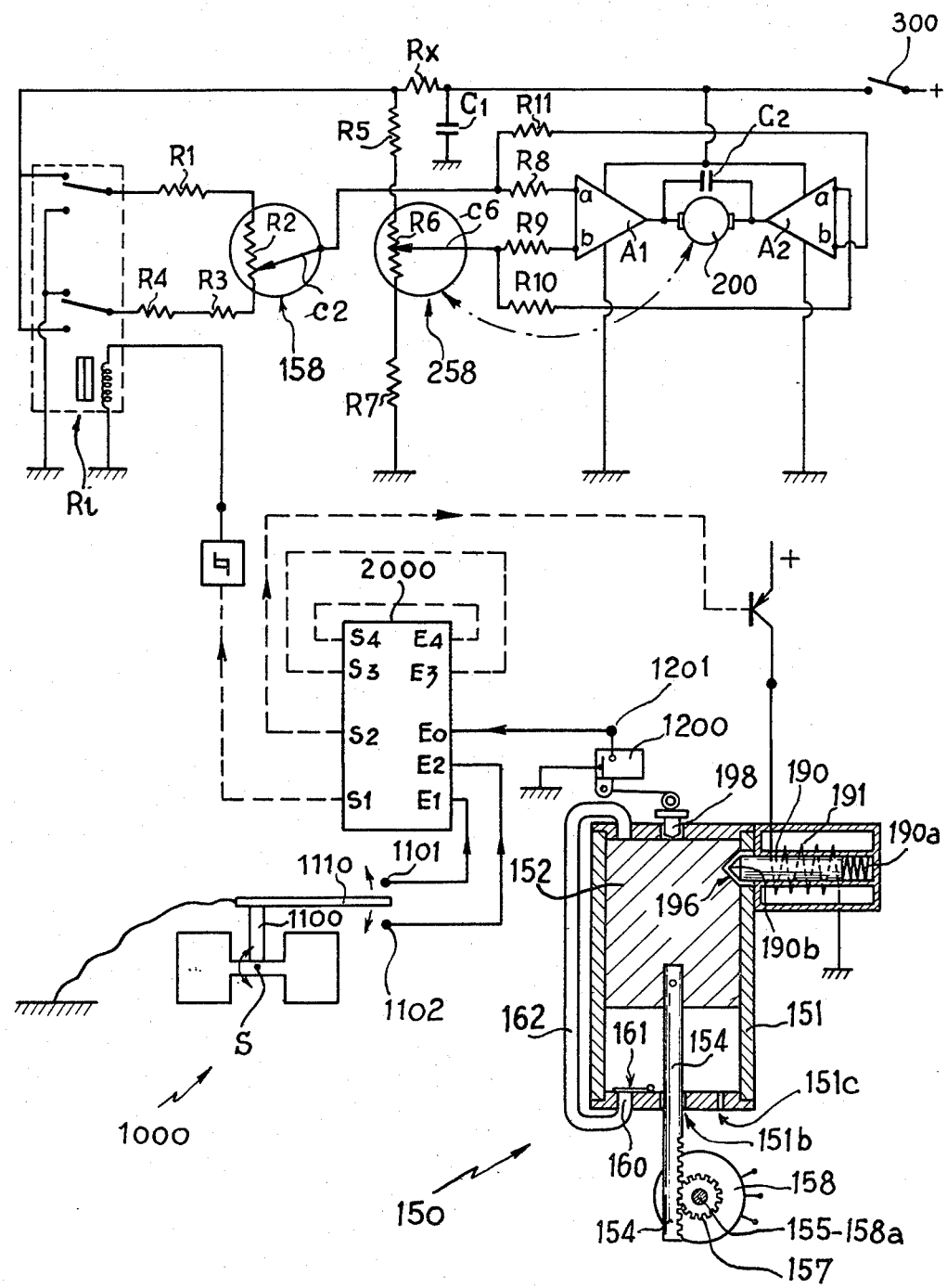

HEADLIGHT SYSTEMS FOR MOTOR CYCLES

BACKGROUND OF THE INVENTION

1. Field of the Invention

This invention relates to headlight systems for motor cycles, which are arranged to adjust the orientation of the headlamp beam in such a way as to compensate for the lateral inclination of the motor cycle when travelling along a curved path.

2. Description of the Prior Art

Various such systems have already been proposed in my earlier U.S. Pat. Nos. 3,939,339 and 4,075,469. In U.S. Pat. No. 3,939,339, a system is proposed which senses the magnitude of the angle of lean of the motor cycle by means of an acceleration transducer comprising a mass which is movable under the control of a spring, in a direction which is generally vertical when the motor cycle is upright. Such an acceleration transducer cannot distinguish between inclination to the left and inclination to the right, and therefore some kind of additional mechanism has to be provided to ensure that the headlamp beam is adjusted in the correct sense to affect the necessary compensation. In U.S. Pat. No. 3,939,339, it was proposed to operate this mechanism in dependence on the direction in which the motor cycle handlebars are turned.

In U.S. Pat. No. 4,075,469, it is proposed to use a gyroscope system to detect both the magnitude and the sense of the inclination of the motor cycle. The use of a gyroscope system has the theoretical advantage that only a single sensing arrangement provides all the information that is needed.

However, it has been found that there are difficulties in providing a sufficiently accurate gyroscope system; also the gyroscope system may suffer from drift, resulting in orientation errors.

It is an object of the present invention to provide a headlight adjusting system employing a gyroscope system only to discriminate between inclinations to the left and to the right, and employing other means to detect the magnitude of the inclination of the motor cycle.

SUMMARY OF THE INVENTION

According to one aspect of the present invention, a system for automatically adjusting the orientation of the beam of light of the headlamp of a motor cycle or similar two-wheeled vehicle comprises;

means for turning at least the optical system of the headlamp about an axis of rotation which is generally fore and aft of the vehicle;

an acceleration transducer comprising a mass which is adapted to be mechanically displaced by the centripetal acceleration of the vehicle when travelling along a curved path, the amount of such mechanical displacement being indicative of the angle of inclination of the vehicle, and serving to control the amount by which the optical system of the headlamp is turned by the turning means;

and a gyroscope system mounted on the vehicle and arranged to provide signals indicating whether the vehicle is leaning to the left or to the right, such signals serving to control the sense in which the optical system of the headlamp is turned by the turning means.

In a preferred embodiment, the system also includes: a read-only memory having address inputs to which are applied the signals from the gyroscope system indicating whether the vehicle is leaning to the right or to the left; means arranged to sense when the said mass adopts a position corresponding to a zero centripetal acceleration, and to apply to an address input of the read-only memory a signal indicating that the said mass has adopted such a position; a locking device connected to be controlled by an output of the read-only memory, and arranged to co-operate with the mass to retain the mass in its said position, and means connected to a further output of the read-only memory and arranged to transmit the further output to the optical system turning means, to control the sense in which the optical system of the headlamp is turned.

DESCRIPTION OF THE DRAWINGS

The invention may be carried into practice in various ways but one specific embodiment will now be described by way of example, with reference to the accompanying drawing, of which the single FIGURE is a diagrammatic representation of a system for adjusting the orientation of the headlight of a motor cycle in such a way that the attitude of the cut-off of the headlight beam remains substantially unchanged when the motor cycle travels around a curve. This figure corresponds to FIG. 8 of my earlier U.S. Pat. No. 3,939,339 and the same reference numerals are used for parts which are identical or similar to parts shown in the earlier patent.

DESCRIPTION OF THE PREFERRED EMBODIMENT

The mechanical details which are illustrated in FIGS. 7 and 9 of my earlier patent are used without modification in the system which is about to be described and reference should be made to the earlier patent for a detailed description of these details. Briefly, however, the headlamp is rotatably mounted within a casing which is rigidly attached to some forward part of the motor cycle, usually the front forks. The axis of headlamp rotation lies close to the optical axis of the headlamp; usually, it will be advantageous for the rotation axis to diverge slightly downwards away from the optical axis in the forward direction. A reversible d.c. motor 200 is arranged to rotate the headlamp through reduction gearing, while a rotary potentiometer 258 is mechanically connected to the headlamp to provide a feedback signal representing the angle of rotation of the headlamp from its normal position. The output voltage of the potentiometer 258 is compared with the output voltage of a second rotary potentiometer 158 by a pair of amplifiers A1 and A2. (The potentiometer 158 is shown twice in the drawing, once to illustrate its electrical connections, and once to illustrate how it is mechanically operated). If there is any discrepancy between the voltages from the potentiometers 158 and 258, the amplifiers A1 and A2 drive the motor 200 in such a sense as to reduce this discrepancy. In this way, the signal from the potentiometer 158 acts as a set-value signal determining how far (and in which sense) the headlamp should be rotated.

The potentiometer 158 forms part of an acceleration transducer arrangement 150, comprising a vertical cylinder 151 within which a mass 152 is vertically slidable, against the action of a spring (not shown; item 153a in FIG. 7 of the earlier patent) which tends to maintain the mass 152 at the top of the cylinder 151. An orifice 151c and a passage 162 provide pneumatic damping of the movement of the mass 152. When the motor cycle is upright and travelling in a straight line, the mass 152 is at the top of the cylinder 151, and is maintained in this position by means of a stud 190, biassed by a spring 190a to engage in a notch 196 formed in the mass 152. The fact that the mass is at the top of the cylinder can be detected by a microswitch 1200, which has an operating arm 198. When the motor cycle is banked over to travel around a curve, the mass 152 has to be allowed to move downwards in the cylinder 151 under the combined influence of gravity and the centripetal acceleration of the motor cycle, so that the potentiometer 158 will be rotated to give a signal indicative of the angle of lean of the motor cycle. To allow this downward movement to occur, a solenoid 191 is energised to withdraw the stud 190 from the notch 96; means (yet to be described) are provided to ascertain when the solenoid 191 should be energised.

Since the acceleration transducer produces identical signals in response to inclination of the motor cycle in either direction, means (yet to be described) are provided to discriminate between right-hand and left-hand turns. The discriminating means controls a relay Ri, energising the relay for one direction only of turn. The contacts of the relay change over the circuits associated with the potentiometer 158, to reverse the direction of rotation of the headlamp resulting from a downward movement of the mass 152.

The parts of the system so far described are identical to the corresponding parts of FIG. 8 of my earlier U.S. Pat. No. 3,939,339.

The means for discriminating between right-hand and left-hand turns comprises a rate gyroscope 1000, which may be of the general type disclosed in my earlier U.S. Pat. No. 4,075,469. In such a gyroscope, the rotor rotates about a horizontal axis which is transverse of the motor cycle, while the rotor axis is so constrained that it can swing only about a vertical axis 5, against a spring which tends to maintain the rotor axis stationary relative to the motor cycle. Thus, when the angle of inclination of the motor cycle changes, the gyroscope rotor axis will swing in one direction or other about the axis 5, depending on the direction of the change of inclination. An electrically conductive member 1100 is mounted to make the same swinging movement as the rotor axis, and carries a very flexible strip 1110 which is arranged to contact one or other of two contacts 1101 and 1102 when such swinging occurs. The conductive member 1100 is earthed, and connections are provided from the contacts 1101 and 1102 to two address inputs $E_1$ and $E_2$ of a read-only memory 2000; the interfacing between the contacts and the memory 2000 is such that when the contact 1101 is earthed (indicating that the motor cycle is rolling over towards the left), a logical '1' is applied to the address input $E_1$ of the memory, while when the contact 1102 is earthed (indicating that the motor cycle is rolling over towards the right), a logical '1' is applied to the address input $E_2$ of the memory. At all other times, a logical '0' is applied to both inputs $E_1$ and $E_2$.

A further address input $E_0$ of the memory 2000 is controlled by the microswitch 1200; when the mass 152 is at the top of the cylinder 151, an earth is applied from terminal 1201 of the microswitch to the address input $E_0$, and this corresponds to a logical '1'.

The read-only memory 2000 has two further address inputs $E_3$ and $E_4$, which are respectively connected directly to two data outputs $S_3$ and $S_4$ of the memory. This allows the memory to have more than one stable state in response to a given set of conditions on the address inputs $E_0$, $E_1$ and $E_2$, for reasons which will become clear.

Two further data outputs $S_1$ and $S_2$ of the memory 2000 respectively control the relay Ri and the solenoid 191. A logical '1' on the data output $S_1$ energises the relay, while a logical '0' on the data output $S_2$ energises the solenoid 191.

The read-only memory 2000 has 15 different states which will occur during normal operation of the system. These states are as follows:

| State No. | $E_0$ | $E_1$ | $E_2$ | $E_3$ | $E_4$ | $S_1$ | $S_2$ | $S_3$ | $S_4$ |
|---|---|---|---|---|---|---|---|---|---|
| 1  | 1 | 0 | 0 | 0 | 0 | 0 | 1 | 0 | 0 |
| 2  | 1 | 0 | 1 | 0 | 0 | 0 | 0 | 1 | 0 |
| 3  | 1 | 0 | 1 | 1 | 0 | 0 | 0 | 1 | 0 |
| 4  | 0 | 0 | 1 | 1 | 0 | 0 | 0 | 1 | 0 |
| 5  | 0 | 0 | 0 | 1 | 0 | 0 | 0 | 1 | 0 |
| 6  | 0 | 1 | 0 | 1 | 0 | 0 | 0 | 1 | 0 |
| 7  | 1 | 0 | 0 | 1 | 0 | 0 | 1 | 0 | 0 |
| 8  | 1 | 1 | 0 | 1 | 0 | 0 | 0 | 0 | 0 |
| 9  | 1 | 1 | 0 | 0 | 0 | 1 | 0 | 0 | 1 |
| 10 | 1 | 1 | 0 | 0 | 1 | 1 | 0 | 0 | 1 |
| 11 | 0 | 1 | 0 | 0 | 1 | 1 | 0 | 0 | 1 |
| 12 | 0 | 0 | 0 | 0 | 1 | 1 | 0 | 0 | 1 |
| 13 | 1 | 0 | 0 | 0 | 1 | 1 | 1 | 0 | 0 |
| 14 | 0 | 0 | 1 | 0 | 1 | 1 | 0 | 0 | 1 |
| 15 | 1 | 0 | 1 | 0 | 1 | 1 | 0 | 0 | 0 |

State 1 is adopted by the system when the motor cycle is upright and travelling in a straight line: in this state the relay Ri and the solenoid 191 are deenergised. If now the motor cycle begins to roll over to the right, the input $E_2$ will become a logical '1', so that the system adopts State 2. This is an unstable state, because as soon as it occurs, the output $S_3$ becomes a logical '1', causing a corresponding change in the input $E_3$, so that the system passes immediately to State 3. For as long as the input $E_3$ remains a logical '1', the system will act on the assumption that any inclination of the motor cycle is a rightward inclination, and will therefore keep the output $S_1$ at a logical '0', keeping the relay Ri de-energised. In both States 2 and 3, the solenoid 191 is energised, so that the mass 152 can now move in the cylinder 151, sensing the centripetal acceleration of the motor cycle and controlling the rotation of the headlamp. Downward movement of the mass 152 causes the input $E_0$ to become a logical '0', so that the system passes to State 4; this has no effect on the outputs of the memory. From State 4, provided that the input $E_0$ remains at a logical '0', indicating that the motor cycle has not yet returned to an upright position, the system may pass to States 5 or 6, depending on whether the inclination of the motor cycle remains constant or decreases. The outputs of the read-only memory 2000 are identical for States 4, 5 and 6, so that the mass 152 is still free to move. If now the motor cycle returns to an upright position, the mass 152 will return to its top position, and the input $E_0$ will change to a logical '1'. If, when this occurs, the motor cycle is still rolling over towards the left, the system will adopt State 8; this is an unstable state, because as soon as it occurs, the output $S_3$ becomes a logical '0', causing a corresponding change in the input $E_3$, and indicating that the system should no longer assume that the motor cycle is leaning to the right. Thus, the system passes immediately to State 9, which corresponds to State 2, but for left-hand curves, and is therefore also an unstable state. More particularly, as soon as the system adopts State 9, the output $S_4$ becomes a logical '1', causing a corresponding change in the input E, and indicating that the system should act on the assumption that any inclination of the motor cycle is a leftward inclination. From State 9, the system passes to State 10, which corresponds to State 3, but for left-hand curves. In State 10, the relay Ri and the solenoid 191 are both energised, so that the direction of rotation of the headlamp in relation to the signal from the potentiometer 158 is now reversed, to suit the leftward inclination of the motor cycle. States 11, 12, 14 and 15 correspond to States 4, 5, 6 and 8 respectively, but for left-hand curves, and the relay Ri and solenoid 191 remain energised in all these states.

If, when the motor cycle regains an upright position, the rate of change of inclination has become zero, the inputs $E_0$, $E_1$ and $E_2$ become a logical '1', '0' and '0' respectively. Depending on the direction of the immediately preceding inclination, the sytem will adopt either State 7 or State 13. In both these states, the relay Ri and the solenoid 191 are deenergised, so that the mass 152 is locked at the top of the cylinder 151; also, in both these states, the outputs $S_3$ and $S_4$ both become a logical '0', so that the system immediately reverts to its idle state, State 1.

Various types of read-only memory 2000 could be employed; one type which has been found suitable is marketed by Signetics Corporation under the reference 82 S 123. Also, various interfaces may be provided in association with the memory 2000; the drawing indicates by way of example a transistor between the output $S_2$ and the solenoid 191, and a Schmitt trigger between the output $S_1$ and the relay Ri. Suitable interfaces may readily be selected by those skilled in the art.

What I claim as my invention and desire to secure by Letters Patent is:

1. In a (A) system for automatically adjusting the orientation of the beam of light of the headlamp of a motor cycle or similar two-wheeled vehicle, which system comprises:

means for turning at least the optical system of the said headlamp about an axis of rotation which is generally fore and aft of the said vehicle, an acceleration transducer comprising a mass which is adapted to be mechanically displaced by the centripetal acceleration of the said vehicle when travelling along a curved path, the amount of such mechanical displacemet being indicative of the angle of inclination of the said vehicle, and serving to control the amount by which the said optical system of the said headlamp is turned by the said turning means, the improvement comprising a gyroscope system mounted on the said vehicle and arranged to provide signals indicating whether the said vehicle is leaning to the left or to the right, such signals serving to control the sense in which the said optical system of the said headlamp is turned by the said turning means.

2. A system according to claim 1, which system also includes: a read-only memory having address inputs to which are applied the said signals from the said gyroscope system, indicating whether the said vehicle is leaning to the right or to the left; means arranged to sense when the said mass adopts a position corresponding to a zero centripetal acceleration, and to apply to an address input of the said read-only memory a signal indicating that the said mass has adopted such a position; a locking device connected to be controlled by an output of the said read-only memory, and arranged to co-operate with the said mass to retain said mass in its said position; and means connected to a further output of the said read-only memory and arranged to transmit the said further output to the said optical system turning means, to control the sense in which the said optical system of the said headlamp is turned.

3. A system according to claim 2, which system also includes: a potentiometer mechanically connected to be controlled by movements of the said mass; the said optical system turning means comprising a reversible electric motor, and being arranged to change the orientation of the said beam of light from the normal beam position by an amount corresponding to the output voltage of the said potentiometer; and the said optical system turning means also comprising a relay connected to be operated by the said further output of the said read-only memory and, when so operated, to reverse the polarity of the voltage supplied to the said potentiometer.

4. A system according to claim 1 or claim 2 or claim 3, wherein the said gyroscope system comprises a rate gyroscope, the direction of the rotor axis of which shifts in one sense or other from a rest position as the vehicle rolls towards the left or the right, and the rate gyroscope being operatively associated with a pair of electrical contacts arranged to be operated by such shifting of the said rate gyroscope to provide signals indicative of rolling movements of the vehicle towards the left or the right.

5. A system according to claim 1, said mass being mounted on said vehicle and movable in a direction which is generally vertical when said vehicle is upright;
   a spring controlling movements of said mass;
   said mass and spring together forming said acceleration transducer and being sensitive both to gravity and to said centripetal acceleration;
   means operatively interconnecting said acceleration transducer and said turning means and arranged to sense the position of said mass and to control said turning means to turn said optical system through an angle corresponding to the displacement of said mass from the position adopted by said mass when said cetripetal acceleration is zero;
   said gyroscope system being arranged to respond to lateral rolling movements of said vehicle.

* * * * *